United States Patent [19]
Galati et al.

[11] Patent Number: 4,712,109

[45] Date of Patent: Dec. 8, 1987

[54] DEVICE FOR THE IDENTIFICATION OF UNDESIRABLE ECHOES IN RADAR SYSTEMS

[75] Inventors: Gaspare Galati; Mario Orsini, both of Rome, Italy

[73] Assignee: Selenia Industrie Elettroniche Associate S.p.A., Rome, Italy

[21] Appl. No.: 860,345

[22] PCT Filed: Jul. 24, 1985

[86] PCT No.: PCT/IT85/00019

§ 371 Date: May 27, 1986

§ 102(e) Date: May 27, 1986

[87] PCT Pub. No.: WO86/00999

PCT Pub. Date: Feb. 13, 1986

[30] Foreign Application Priority Data

Jul. 27, 1984 [IT] Italy ................ 48645 A/84

[51] Int. Cl.$^4$ .................................... G01S 7/66
[52] U.S. Cl. ................................ 342/159; 342/194; 342/195
[58] Field of Search ............... 342/89, 93, 159–164, 342/194, 195

[56] References Cited

U.S. PATENT DOCUMENTS

| 4,044,352 | 8/1977 | Wilmot | 342/89 |
| 4,086,592 | 4/1978 | Lewis et al. | 342/381 |
| 4,217,584 | 8/1980 | Lombardi et al. | 342/89 |
| 4,578,676 | 3/1986 | Harrison, Jr. | 342/89 |

FOREIGN PATENT DOCUMENTS 0054982 6/1982 European Pat. Off. .
0062519 10/1982 European Pat. Off. .

OTHER PUBLICATIONS

Nitzberg, "Low-Loss Almost Constant False Alarm Rate Processors"; IEEE Trans. on Aerospace and Electronic Systems (vol. AES-15, #5, 9/79; New York).
Traynar et al, "C.C.D. Integration Techniques for Clutter Reduction in Radar Systems"; The Radio and Electronic Engineer (vol. 50; No. 5; 5/80; London).

Primary Examiner—T. H. Tubbesing
Assistant Examiner—Bernarr Earl Gregory
Attorney, Agent, or Firm—Stiefel, Gross, Kurland & Pavane

[57] ABSTRACT

A device for the detection of undesirable echoes which have significant correlation in azimuth which is applicable to surveillance or tracking radars. The device works through autocorrelation function estimation over a pair of pulses received by averaging, over N range cells, the complex product of the received signal $Z_k(t_1)$, relevant to the K-th range bin and time instant $t_1$, with the complex conjugate value $Z_k(t_1+T)$, still relevant to the K-th range bin, at instant $t_1+T$ (where T is the pulse repetition period, PRT).

3 Claims, 2 Drawing Figures

DEVICE FOR THE IDENTIFICATION OF UNDESIRABLE ECHOES IN RADAR SYSTEMS

BACKGROUND OF THE INVENTION

The present invention relates to a device for the identification of undesirable echoes in radar systems.

Such invention belongs to the radar field and more exactly to the field of surveillance or tracking radars.

At present, undesirable echoes are recognized by relying upon two distinct techniques:

(a) Estimate of the power at the radar receiver input by means of the overage of the power level over a group of echoes relevant to the same impulse transmitted and further comparison with a fixed precalculated threshold;

(b) Measurement of the number of times a precalculated threshold is crossed by the receiver input power into a group of echoes relevant to the same impulse transmitted.

Such techniques, however, suffer poor sensitivity, and present poor discrimination between echo sources (clutter, jammer, asynchronous pulses and targets).

SUMMARY OF THE INVENTION

An object of the present invention is a device which can detect the presence of undesirable echoes having large azimuth correlation coefficient (clutter) and discriminate them against echoes having small correlation coefficient (jammer, asynchronous pulse). The device operates on an estimate of the auto correlation function C (which here coincides with the autocovariance function as the mean value is nil, as shown by Papoulis: Probability, Random Variables and Stochastic Processes, International Student Edition McGraw Hill paragraph 9-3) by averaging, over N range bins, the complex product of the signal received $Z_K(t_1)$ related to the K-th range bin and to generic instant $t_1$ and the complex conjugate value $Z_K^*(t_1+T)$ still relevant to the K-th range bin, but at time $t_1+T$ (where T is the pulse repetition period):

$$C(T) = \frac{1}{N} \sum_{j=1}^{N} Z_{K+j}(t_1) \times Z_{K+j}(t_1 + T) = \frac{1}{N} \sum_{j=1}^{N} C_{K+j}(T) \quad (1)$$

The crossing of a threshold S by the modulus /C(T)/ of the estimated value, indicates the presence of a correlated disturbance in azimuth (clutter) in the examined range bins (i.e. range cells).

The threshold S is suitably calculated to obtain the desired false detection probability.

BRIEF DESCRIPTION OF THE DRAWINGS

The present invention will now be described with reference to some of its actually preferred forms of implementation and these are reported as an illustration, are not limited to these and make reference to the drawings attached where.

DETAILED DESCRIPTION OF THE INVENTION

Figure 1:
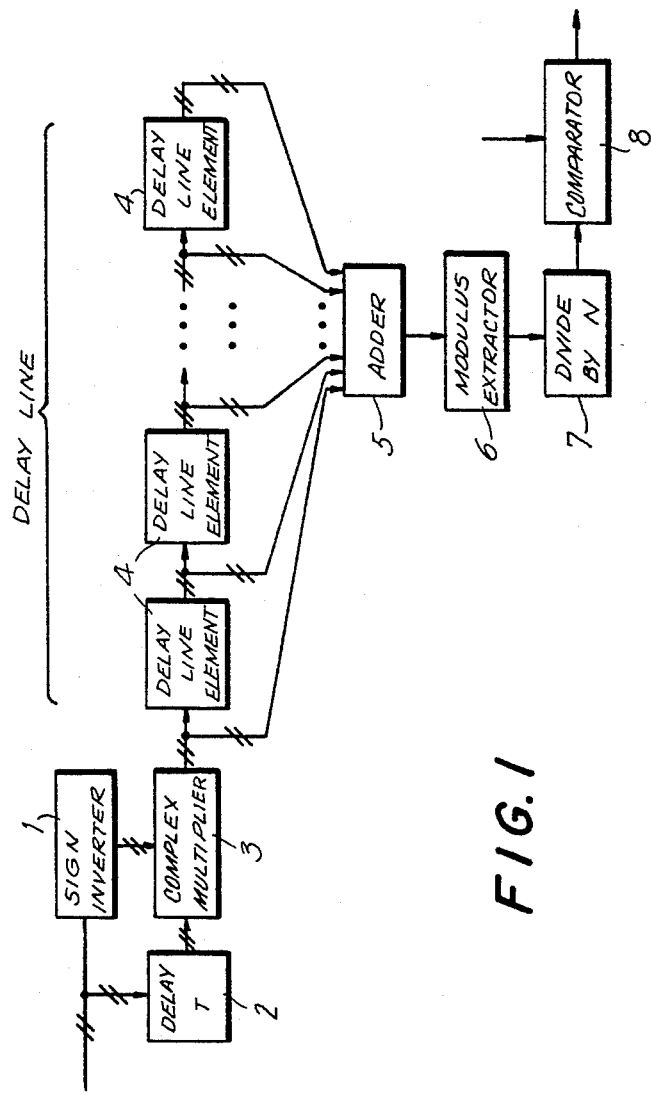
FIG. 1 shows a block diagram of the device.

The figures may be described in further detail as follows:

FIG. 1 shows a block diagram of the device, where the elements listed below have the indicated reference numerals:

Sign inverter of the component Q of vector representing signal, 1;
Delay element having duration T, 2;
Complex multiplier, 3;
Delay line having N intermediate taps, with elementary delay (resolution cell of the radar), 4;
N input adder, 5;
Modulus extractor, 6;
Divider by N, 7;
Comparator with a fixed threshold, 8.

Figure 2:
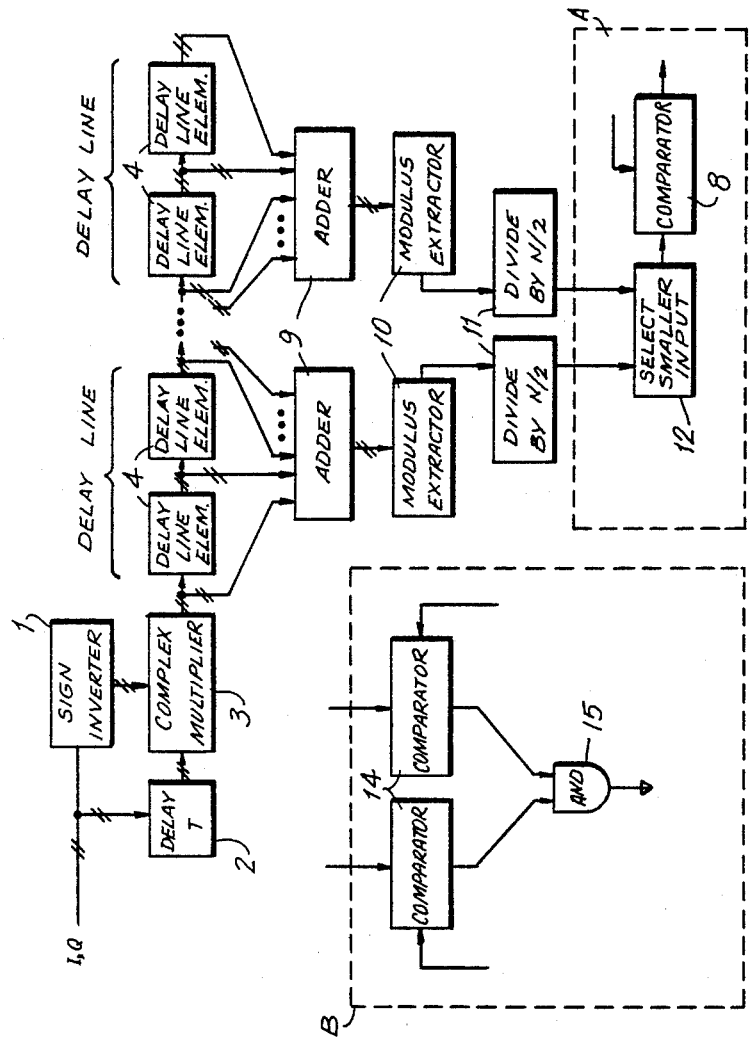
FIG. 2 shows a block diagram of a variant of the present invention which is insensitive to interference, particularly pulsed interference.

FIG. 2 shows a block diagram of a variant of the present invention, where blocks 1,2,3,4,8 have already been described in FIG. 1.

The further blocks are meant to make the device insensitive to interference, particularly to pulsed interference.

They are:
two adders, 9;
two modules extractors, 10;
two divide by N/2, 11.

Blocks A and B within dashed lines are two alternative ways of selecting the smaller of two inputs and further comparing it with the prefixed threshold.

Block A shows the selector of smaller input 12 and the comparator with prefixed threshold 8 (as already seen in FIG. 1).

Block B shows two comparators 14 and an AND logic gate 15.

The present invention will now be described with reference to the two preferred implementations. (Note that I and Q are the two components, in phase and in quadrature, of the input signal Z(t), represented in complex form:

$$Z(t) = I(t) + jQ(t) \quad (2)$$

In FIG. 1, the two components I and Q of input signal Z(t) to be analyzed are sampled at instants $t_0, t_0+ \ldots t_0+n$, where $t_0$ is the initial time instant and n is the sampling period. These samples are delayed by time T and are suitably processed to obtain their complex conjugate. Thereafter the complex product is carried out to obtain autocorrelation function $C_{K+j}(T)$ to be averaged over N samples. This value is sent to a delay line with N taps (having elementary delays) the outputs of which are added, divided by N and sent to a modulus extractor to obtain /C(T)/. The value obtained is compared to threshold S, settable, which discriminates between disturbance detection and the absence thereof.

The second diagram, provided in FIG. 2, shows an input processing sequence which is identical to the one performed by the first schematic, up to tapped delay line output signal $C_{K+j}(T)$.

In the new diagram these outputs are split into two groups and in turn are sent to two adders, to two divide by N/2 circuits and to two modulus extractors.

Values /C₁(T)/ and /C₂(T)/ obtained may be processed in two perfectly equivalent ways to obtain detection.

The first way is to select the minor between /C₁(T)/ and /C₂(T)/ and to compare it with threshold S. The second way is to compare /C₁(T)/ and /C₂(T)/ with the threshold S and then to send the output to a logic "AND" for detection.

Modifications made to diagram 2 of FIG. 2 compared to diagram 1 (FIG. 1) have been introduced to obtain better discrimination in the presence of a strong asynchronous impulse (which we do not wish to detect).

To exemplify how the device of this invention works we may posit three cases:

(a) presence of clutter echoes:
  samples are present in more than one sweep in areas extended in range and are strongly correlated in azimuth;
(b) presence of jammer echoes:
  samples are present in more than one sweep over the whole range and are not correlated in azimuth
(c) presence of asynchronous impulse echoes:
  samples present at random over a few isolated range cells.

In case a: clutter is detected by the device described in FIGS. 1 and 2 respectively with probabilities $P_{C1}$ and $P_{C2}$ depending on the value S of the threshold, on the clutter power and on the correlation coefficient.

In case b: the jammer, which is not correlated in azimuth, is detected with probability $P_{J1}$, by the device depected in FIG. 1 and with probability $P_{J2}$ by the device in FIG. 2. For a fixed value of S these probabilities are much less than those for clutter $P_{C1}$ and $P_{C2}$. Therefore the discrimination between clutter and jammer is achieved, which is a characteristic of the present invention with respect to previous techniques.

In case c, the asynchronous pulse, which is usually very high in power, will be detected with a good probability by means of the solution given in FIG. 1, while it will cause only slight performance degradation of the device in FIG. 2, which will drop the estimate, either $C_1$ (T') or $C_2$ (t) affected by the error due to the asynchronous impulse.

What is claimed is:

1. A device for the detection of a plurality of different types of undesirable echoes in radar systems, said device comprising means for detecting the presence of undesirable echoes having a large azimuth correlation coefficient and echoes having a small correlation coefficient and means for discriminating said detected large azimuth correlation coefficient echoes against said detected small correlation coefficient echoes comprising an element which changes the sign of the quadrature component of the vector of the complex signal at input 1; an element introducing delay T which resets in time the input present to that present during the previous sweep, 2; a complex multiplier 3 which multiplies the outputs of blocks 1 and 2; a tapped delay line, 4, with elementary delay; an adder, 5, of the N outputs from delay line 4: a modulus extractor, 6, of adder output 5; a divide by N, 7 of the modulus extractor output; a comparator, 8, which by comparing the divide by N output with a settable threshold, generates a binary indication related to clutter detection.

2. A device for the detection of a plurality of different types of undesirable echoes in radar systems, said device comprising means for detecting the presence of undesirable echoes having a large azimuth correlation coefficient and echoes having a small correlation coefficient and means for discriminating said detected large azimuth correlation coefficient echoes against said detected small correlation coefficient echoes comprising an element which changes the sign of the quadrature component of the vector of the complex signal at input 1; an element introducing delay T which resets in time the input present to that present during the previous sweep, 2; a complex multiplier 3 which multiplies the outputs of blocks 1 and 2; a tapped delay line, 4, with elementary delay; two adders, 9, of delay line outputs 4; two modulus extractors, 10, of adder outputs 9; two divide by N/2, 11, of modulus extractors 10; a selector of the smaller, 12, of the two inputs from the modulus extractors; and a comparator, 8, which by comparing the smaller of the divide by N/2 outputs with a settable threshold, generates a binary indication related to clutter detection.

3. The device of claim 2 further comprising two comparators, 14, which, through comparison with a settable threshhold of the dividers' two outputs, give two binary indications; and an AND logic gate 15, fed by the comparators' outputs, which gives a binary indication of undesirable disturbance detection.

* * * * *